(12) United States Patent
Kitano (10) Patent No.: US 10,720,638 B2
(45) Date of Patent: Jul. 21, 2020

(54) CARBON-SILICON COMPOSITE MATERIAL, NEGATIVE ELECTRODE, SECONDARY BATTERY, AND CARBON-SILICON COMPOSITE MATERIAL PRODUCING METHOD

(71) Applicant: Tec One Co., Ltd., Nomi-shi (JP)

(72) Inventor: Takahiro Kitano, Nomi (JP)

(73) Assignee: Tee One Co., Ltd., Nomi-shi (JP)

( * ) Notice: Subject to any disclaimer, the term of this patent is extended or adjusted under 35 U.S.C. 154(b) by 204 days.

(21) Appl. No.: 15/574,894

(22) PCT Filed: Oct. 19, 2016

(86) PCT No.: PCT/JP2016/081006
§ 371 (c)(1),
(2) Date: Nov. 17, 2017

(87) PCT Pub. No.: WO2018/073916
PCT Pub. Date: Apr. 26, 2018

(65) Prior Publication Data
US 2018/0301695 A1 Oct. 18, 2018

(51) Int. Cl.
*H01M 4/36* (2006.01)
*H01M 4/38* (2006.01)
(Continued)

(52) U.S. Cl.
CPC .......... *H01M 4/364* (2013.01); *C04B 35/532* (2013.01); *C04B 35/63416* (2013.01); *C04B 35/64* (2013.01); *H01M 4/134* (2013.01); *H01M 4/1395* (2013.01); *H01M 4/386* (2013.01); *H01M 4/587* (2013.01); *H01M 4/621* (2013.01);
(Continued)

(58) Field of Classification Search
CPC .................................................. C04B 35/532
See application file for complete search history.

(56) References Cited

U.S. PATENT DOCUMENTS

2010/0301276 A1\* 12/2010 Lee ..................... C23C 18/54
252/500
2011/0070491 A1 3/2011 Campbell et al.
(Continued)

FOREIGN PATENT DOCUMENTS

JP 2004-103546 A 4/2004
JP 2005-235589 A 9/2005
(Continued)

OTHER PUBLICATIONS

Office Action dated Sep. 11, 2018 in Korean Patent Application No. 10-2017-7027198, 11 pages (with unedited computer generated English translation).
(Continued)

*Primary Examiner* — Peter F Godenschwager
(74) *Attorney, Agent, or Firm* — Oblon, McClelland, Maier & Neustadt, L.L.P.

(57) ABSTRACT

The present invention provides a carbon-silicon composite material suitable (e.g., high capacity; small irreversible capacity; long cycle life) to be used as a negative electrode material for battery. The carbon-silicon composite material comprises a carbon black and a silicon particle, wherein the carbon black and the silicon particle are bound via a resin thermolysis product.

8 Claims, 4 Drawing Sheets

(51) Int. Cl.
*H01M 4/62* (2006.01)
*H01M 10/0525* (2010.01)
*C04B 35/532* (2006.01)
*C04B 35/634* (2006.01)
*C04B 35/64* (2006.01)
*H01M 4/587* (2010.01)
*H01M 4/134* (2010.01)
*H01M 4/1395* (2010.01)
*H01M 4/02* (2006.01)
*H01M 10/052* (2010.01)

(52) U.S. Cl.
CPC ....... *H01M 4/625* (2013.01); *H01M 10/0525* (2013.01); *C04B 2235/424* (2013.01); *C04B 2235/428* (2013.01); *C04B 2235/48* (2013.01); *C04B 2235/526* (2013.01); *C04B 2235/5264* (2013.01); *C04B 2235/5436* (2013.01); *C04B 2235/785* (2013.01); *C04B 2235/786* (2013.01); *H01M 10/052* (2013.01); *H01M 2004/021* (2013.01); *H01M 2004/027* (2013.01)

(56) References Cited

U.S. PATENT DOCUMENTS

2014/0091033 A1    4/2014  Kitano
2014/0154576 A1    6/2014  Kang et al.
2015/0076742 A1    3/2015  Joo et al.
2015/0099185 A1    4/2015  Joo et al.
2015/0099186 A1    4/2015  Joo et al.
2017/0191193 A1    7/2017  Joo et al.
2017/0352878 A1*  12/2017  Kajita .................... C01B 32/22

FOREIGN PATENT DOCUMENTS

| JP | 2008-186732 A | 8/2008 |
| JP | 2011-527982 A | 11/2011 |
| JP | 2013-534024 A | 8/2013 |
| JP | 2015-502025 A | 1/2015 |
| JP | 2015-516516 A | 6/2015 |
| JP | 2015-135811 A | 7/2015 |
| JP | 2016-28375 A | 2/2016 |
| KR | 10-2016-0088338 A | 7/2016 |
| WO | WO 2014/160174 A1 | 10/2014 |

OTHER PUBLICATIONS

Office Action dated Jan. 25, 2019 in co-pending U.S. Appl. No. 15/308,649, 13 pages.
International Search Report dated Jan. 17, 2017 in PCT/JP2016/081006 filed Oct. 19, 2016 (with Translation of Category of Cited Documents).

* cited by examiner

CARBON-SILICON COMPOSITE MATERIAL, NEGATIVE ELECTRODE, SECONDARY BATTERY, AND CARBON-SILICON COMPOSITE MATERIAL PRODUCING METHOD

TECHNICAL FIELD

The present invention relates to a carbon-silicon (C—Si) composite material.

BACKGROUND ART

A silicon (Si) based material is receiving a lot of attention as a negative electrode material for lithium ion battery.

Addition of a Si particle simple substance as a negative electrode active material, however, causes a large volume change (about 300%) as with inserting (intercalating)/separating of lithium ion. This involves progress of disintegrating of a Si particle, resulting in inviting a short cycle life. Further, due to mechanical disruption of Si negative electrode during an alloying/dealloying process thereof, immediate and irreversible reduction in an amount will occur, followed by lowering of coulombic efficiency.

A C—Si composite material is drawing an attention as a technology capable of solving the above described problem.

JP 2013-534024 A (Patent Literature 1) proposes: for example, "a combined hard carbon anode material for lithium ion battery characterized in that: a surface of a hard carbon substrate of the combined hard carbon anode material for lithium ion battery is covered with an encapsulated substance; and a precursor of the encapsulated substance is at least one of organic matters of epoxy resin, phenolic resin, carboxymethyl cellulose, pitch, ethyl methyl carbonate, polyvinyl alcohol, polystyrene, polymethyl methacrylate, polytetrafluoroethylene, polyvinylidene fluoride, polyacrylonitrile, butadiene-styrene rubber, polyvinyl chloride, polyethylene, polyethylene oxide, polypropylene oxide, polyethylene succinate, polyethylene sebacate, polyethylene glycol imine, polyacetylene, polyparaphenylene, polyaniline, polypyrrole, polyacene, poly(m-phenylenediamine), polythiophene, poly(p-phenylene vinylene), polythiophene, polyacrylonitrile, polyimide, and polyphenylene sulfide, the organic matter/organic matters being pyroliytically decomposed to be formed into the encapsulated substance" and "a method for producing a combined hard carbon anode material for lithium ion battery including: Step 1 of obtaining a solid precursor by curing a thermoplastic resin for 3-50 hours at normal temperature in the air; Step 2 of obtaining powder having a particle size of 1-60 μm based on the precursor, at a nitrogen gas flow rate of 0.1-0.4 m$^3$/hr., by raising a temperature of the precursor to 150° C.–450° C. at a rate of 0.1-3° C./min., presintering it at a low temperature for 2-24 hours, and naturally lowering the temperature thereof to the room temperature, followed by unraveling thereof; Step 3 of obtaining a hard carbon, at a nitrogen gas flow rate of 0.1-0.4 m$^3$/min., by raising a temperature of the obtained powder to 560-1500° C. at a rate of 0.3-10° C./min., pyrolytically decomposing it for 0.5-7.5 hours, and naturally lowering the temperature thereof to the room temperature; Step 4 of obtaining a hard carbon substrate having a particle size of 1-60 μm by subjecting the obtained hard carbon to ball milling or pulverization; and Step 5 of obtaining a combined hard carbon anode material for lithium ion battery by adding a precursor of an encapsulated substance to the hard carbon substrate by an amount of 1-15 mass % of the precursor of the hard carbon substrate, mixing them at a rotation speed of 1400-3500 r/min. for 20-50 min., then, at a nitrogen gas flow rate of 0.1-0.4 m$^3$/hr., raising a temperature thereof to 500-1500° C. at a rate of 1-7.5° C./min., pyrolytically decomposing the encapsulated substance for 2-8 hours, and naturally lowering the temperature thereof to the room temperature, wherein the thermoplastic resin is at least one of acrylic resin, polyvinyl chloride, polycarbonate, epoxy resin, phenolic resin, and polyformaldehyde; and wherein the precursor of the encapsulated substance is at least one organic matter of epoxy resin, phenolic resin, carboxymethyl cellulose, pitch, ethyl methyl carbonate, polyvinyl alcohol, polystyrene, polymethyl methacrylate, polytetrafluoroethylene, polyvinylidene fluoride, polyacrylonitrile, butadiene-styrene rubber, polyvinyl chloride, polyethylene, polyethylene oxide, poly propane oxide, polyethylene succinate, polyethylene sebacate, polyethylene glycol imine, polyacetylene, polyparaphenylene, polyaniline, polypyrrole, polyacene, poly(m-phenylenediamine), polythiophene, poly(p-phenylene vinylene), polythiophene, polyacrylonitrile, polyimide, and polyphenylene sulfide".

JP 2011-527982 A (Patent Literature 2) proposes: "a method for producing a conductive porous silicon and/or a tin-containing material to be used in producing an anode material for lithium ion battery, characterized in that: in a first processing step, a silicon nanoparticle and/or a tin nanoparticle and/or a silicon/tin nanoparticle is/are introduced into a matrix based on at least one polymer to be, specially, dispersed therein; and, in a second processing step, the polymer matrix containing the silicon nanoparticle and/or the tin nanoparticle and/or the silicon/tin nanoparticle is carbonized to be a carbon" and "the conductive porous silicon and/or tin-containing carbon material characterized in that the silicon and/or tin-containing carbon material contains a silicon nanoparticle and/or a tin nanoparticle and/or a silicon/tin nanoparticle in a porous carbon matrix, in the conductive porous silicon and/or the tin-containing carbon material, for producing the anode material for lithium ion battery."

CITATION LIST

Patent Literature

[PATENT LITERATURE 1] JP 2013-534024 A
[PATENT LITERATURE 2] JP 2011-527982 A

SUMMARY OF INVENTION

Technical Problem

The above listed Patent Literatures state that effects of improvement in a cycle life and reduction of an irreversible capacity could be produced.

However, in the Patent Literature 1, if a thermoplastic resin is once heated, it comes to lose its shape and thus cannot be recovered. Therefore, a curing agent should be once added to the thermoplastic resin for hardening thereof. This, however, invites complication in a producing step. Further, for producing the same, a catalyst is necessary in order to activate the hard carbon substrate and to make it a porous body. This prevents increase of a Si content and thus makes it difficult to produce a high capacity negative electrode material.

In the Patent Literature 2, a Si content cannot be increased because of the producing method in which Si nanoparticles are dispersed in a monomer to be polymerized for obtaining a polymeric matrix.

To solve the above problem, a first aspect of the present invention is to provide a carbon-silicon composite material containing an increased Si content and thus suitable as a negative electrode material (high capacity and low irreversible capacity).

To solve the above problem, a second aspect of the present invention is to provide a carbon-silicon composite material having a long cycle life.

Solution to Problem

The present invention proposes a carbon-silicon composite material comprising:
 a carbon black; and
 a silicon particle;
wherein the carbon black and the silicon particle are bound via a resin thermolysis product.

The present invention proposes the carbon-silicon composite material, wherein the carbon black has a primary particle size of 21-69 nm.

The present invention proposes the carbon-silicon composite material, wherein the silicon particle has a grain size of 0.05-3 μm.

The present invention proposes the carbon-silicon composite material, wherein the resin thermolysis product exists on a surface of the silicon particle.

The present invention proposes the carbon-silicon composite material, wherein the silicon particle is covered with the resin thermolysis product.

The present invention proposes a carbon-silicon composite material, wherein a resin thermolysis product exists on a surface of a silicon particle having a grain size of 0.05-3 μm.

The present invention proposes a carbon-silicon composite material, wherein a silicon particle having a grain size of 0.05-3 μm is covered with a resin thermolysis product.

The present invention proposes the carbon-silicon composite material, wherein a silicon content is 20-96 mass %.

The present invention proposes the carbon-silicon composite material, wherein a carbon content is 4-80 mass %.

The present invention proposes the carbon-silicon composite material, wherein the carbon-silicon composite material is a particle having a diameter of 1-20 μm.

The present invention proposes the carbon-silicon composite material, wherein the carbon-silicon composite material is a fiber having a fiber diameter of 0.5-6.5 μm and a fiber length of 5-65 μm.

The present invention proposes the carbon-silicon composite material, wherein the resin is a thermoplastic resin.

The present invention proposes the carbon-silicon composite material, wherein the resin comprises polyvinyl alcohol.

The present invention proposes the carbon-silicon composite material, wherein the resin mainly comprises polyvinyl alcohol.

The present invention proposes the carbon-silicon composite material, wherein the carbon-silicon composite material is for the use of a negative electrode material for battery.

The present invention proposes a negative electrode, wherein the negative electrode is made of the carbon-silicon composite material.

The present invention proposes a secondary battery, wherein the secondary battery comprises the negative electrode.

The present invention proposes a method for producing a carbon-silicon composite material, the method comprising:
 a dispersing liquid preparation step;
 a solvent removal step; and
 a modification step;
wherein, in the dispersing liquid preparation step, a dispersing liquid comprising a resin, a carbon black, silicon, and a solvent is prepared;
wherein, in the solvent removal step, the solvent is removed from the dispersing liquid; and
wherein, in the modification step, a carbon-silicon composite material precursor obtained in the solvent removal step is modified so as to be a carbon-silicon composite material.

The present invention proposes a method for producing a carbon-silicon composite material, the method comprising:
 a dispersing liquid preparation step;
 a solvent removal step; and
 a modification step;
wherein, in the dispersing liquid preparation step, a dispersing liquid comprising a resin, silicon (having a grain size of 0.05-3 μm), and a solvent is prepared;
wherein, in the solvent removal step, the solvent is removed from the dispersing liquid; and
wherein, in the modification step, a carbon-silicon composite material precursor obtained in the solvent removal step is modified so as to be a carbon-silicon composite material.

The present invention proposes the method for producing the carbon-silicon composite material:
 wherein the resin is a thermoplastic resin.

The present invention proposes the method for producing the carbon-silicon composite material:
 wherein the resin comprises polyvinyl alcohol.

The present invention proposes the method for producing the carbon-silicon composite material:
 wherein the resin mainly comprises polyvinyl alcohol.

The present invention proposes a method for producing a carbon-silicon composite material:
 wherein the method is a method for producing the carbon-silicon composite material.

Advantageous Effect of Invention

A C—Si composite material suitable (e.g., high capacity, small irreversible capacity, and long cycle life) to be used as a negative electrode material for battery can be obtained.

The C—Si composite material has a high Si content.

DESCRIPTION OF EXAMPLES

A first invention is directed to a carbon-silicon (C—Si) composite material. The composite material comprises (contains, includes) a carbon black (CB). The composite material comprises (contains, includes) a silicon (Si) particle. The CB and the Si particle are bound via a resin thermolysis product.

This enabled conductivity of the composite material to be secured even in a case where the Si particle was deformed by charge and discharge. An improved cycle characteristic was obtained. With the carbon black, the cycle characteristic was improved. The conductivity was improved.

Preferably, the carbon black had a primary particle size (grain size of a CB particle in a dispersion state) of 21-69 nm. More preferably, the carbon black had a primary particle size less than 69 nm. Further preferably, the carbon black had a primary particle size of 60 nm or less. Still further preferably, the carbon black had a primary particle size of 55 nm or less. In a case where the primary particle size of the CB particle was too large, the cycle characteristic showed a degradation trend. In a case where the primary particle size of the CB particle was too small, the cycle characteristic showed a degradation trend. The primary particle size (average primary particle size) can be obtained by, for example, a transmission electron microscope (TEM). The primary particle size can be obtained also by a Specific Surface Area by Gas Adsorption (gas adsorption method). Alternatively, the primary particle size can be obtained also by an X-ray scattering technique. The values of the primary particle size (average primary particle size) were obtained by the TEM.

Preferably, the Si particle had a grain size of 0.05-3 μm. More preferably, the Si particle had a grain size of 0.1 μm or more. Further preferably, the Si particle had a grain size of 0.2 μm or more. Still further preferably, the Si particle had a grain size of 0.25 μm or more. Especially preferably, the Si particle had a grain size of 0.3 μm or more. More preferably, the Si particle had a grain size of 2.5 μm or less. In a case where the grain size was too large, the C—Si composite material expanded largely. The cycle characteristic showed a degradation trend. An initial coulombic efficiency showed a lowering trend. In a case where the grain size was too small, the cycle characteristic showed a degradation trend. The initial coulombic efficiency showed a lowering trend. The grain sizes were obtained by an Energy Dispersive X-ray Spectroscopy (EDS). An electron ray was operated focusing on a characteristic X-ray (1.739 eV) of Si. X-ray mapping of silicon was performed. A size of Si particle was obtained from the obtained image.

Preferably, in the C—Si composite material, a resin-decomposed product (thermolysis product) exists on a surface of the Si particle. More preferably, the Si particle is covered by the thermolysis product. The Si particle is preferably covered in its entire surface. Here, it is acceptable if the particle is covered substantially. In so far as the characteristic of the present invention is not deteriorated largely, the Si particle is not necessarily covered in its entire surface. If the Si particle is covered with the thermolysis product, the Si particle (surface) can avoid a contact with an electrolytic solution of a lithium ion secondary battery. Therefore, a side reaction hardly occurs between the Si particle (surface) and the electrolytic solution. As a result, an irreversible capacity decreases.

In the C—Si composite material, exemplified is such a case that a resin-decomposed product (thermolysis product) exists on a surface of the Si particle (grain size: 0.05-3 μm). Preferably, the Si particle is covered with the thermolysis product. Preferably, the Si particle is covered in its entire surface. Here, it is acceptable if the particle is covered substantially. In so far as the characteristic of the present invention is not deteriorated largely, the Si particle is not necessarily covered in its entire surface. The reason thereof has been described above.

Preferably, in the C—Si composite material, a Si content was 20-96 mass %. More preferably, the Si content was 40 mass % or more. Further preferably, the Si content was 95 mass % or less. In a case where the Si content was too small, a capacity as an active material decreased. In a case where the Si content was too large, the conductivity was degraded. The cycle characteristic was lowered.

Preferably, in the C—Si composite material, a carbon content was 4-80 mass %. More preferably, the carbon content was 5 mass % or more. Further preferably, the carbon content was 7 mass % or more. Still further preferably, the carbon content was 10 mass % or more. More preferably, the carbon content was 60 mass % or less. In a case where the carbon content was too small, the cycle characteristic was lowered.

The Si content was obtained by C—Si analysis. More specifically, the C—Si composite material of a known weight was burned by a C—Si analyzing device. A C content was quantitively measured by infrared measurement. The C content was extracted. Accordingly, a Si content was obtained. As it is known from the above, "C content ratio=C content/(C content+Si content), Si content ratio=Si content/(C content+Si content)".

The C—Si composite material may contain impurities. It is not necessary to eliminate components other than the C component and the Si component.

A preferable shape of the composite material is an approximate spherical shape if a filling density of an electrode is important. A preferable shape of the composite material is an approximate fiber shape if the cycle characteristic is important.

Figure 9:
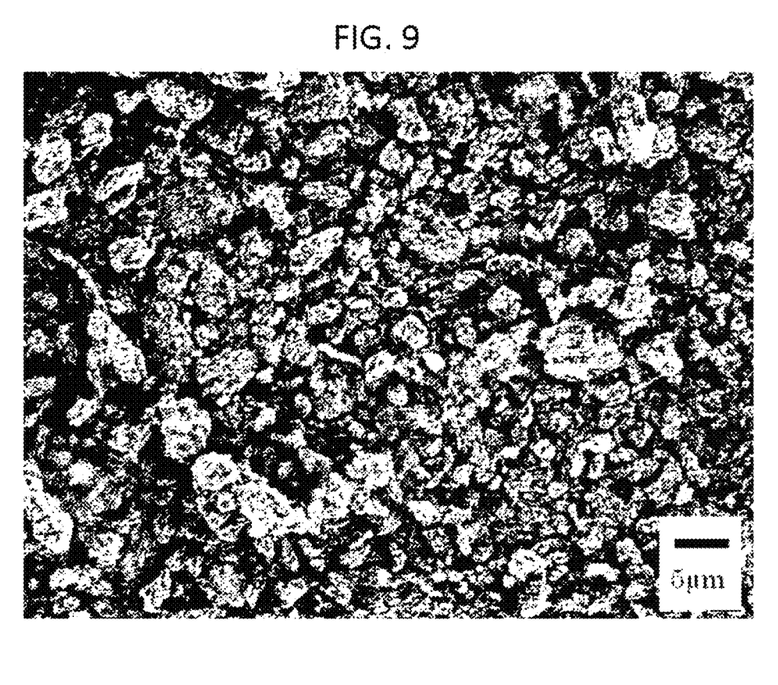
FIG. 9 is a SEM picture.

The granular shaped (approximate spherical shaped) composite material had a particle size of 1-20 μm (diameter). In a case where the particle size was 1 μm or less, a specific surface area became large and a side reaction with an electrolytic solution relatively increased. An irreversible capacity increased. In a case where the particle size was beyond 20 μm, i.e., was large, there was a difficulty in treating the composite material when producing an electrode. More preferably, the particle size was 2 μm or more. Further preferably, the particle size was 5 μm or more. Still further preferably, the particle size was 15 μm or less. Further preferably, the particle size was 10 μm or less. It is not necessary for the composite material to have a perfect spherical shape. For example, the composite material may have an amorphous shape as illustrated in FIG. 9. A diameter thereof can be obtained by using a scanning electron microscope (SEM). The diameter thereof can be obtained also by a laser scattering method. The above described particle sizes were obtained by the SEM.

Preferably, the fiber shaped (approximate fiber shaped) composite material had a fiber diameter of 0.5-6.5 μm and a fiber length of 5-65 μm. In a case where the diameter was too large, there was a difficulty in treating the composite material when producing an electrode. In a case where the diameter was too small, productivity was lowered. In a case where the length was too short, an advantageous characteristic produced by the fiber shape was lost. In a case where the length was too long, there was a difficulty in treating the composite material when producing an electrode. More preferable diameter was 0.8 μm or more. Further preferable diameter was 5 μm or less. More preferable length was 10 μm or more. Further preferable length was 40 μm or less. The above described diameters were obtained from a SEM picture of the composite material. From the SEM picture of the composite material, 10 fiber shaped composite materials were extracted at random and an average diameter thereof was obtained. In a case where the number of the fiber shaped composite material was less than 10 (N number), an average diameter was obtained based on the N number of composite materials. The above described lengths were obtained from a SEM picture of the fiber shaped composite material. From the SEM picture of the fiber shaped composite material, 10 fiber shaped composite materials were extracted at random and an average length thereof was obtained. In a case where the number of the fiber shaped composite materials was less than 10 (N number), an average length was obtained based on the N number of composite materials.

When the spherical shaped composite material and the fiber shaped composite material were mixed to be used, a satisfactory result could be obtained in both the electrode density and the cycle characteristic.

Preferably, a specific surface area of the composite material was 5-50 m$^2$/g. More preferably, the specific surface area was 8 m$^2$/g or more. Further preferably, the specific surface area was 35 m$^2$/g or less. In a case where the specific surface area was too large, a side reaction with an electrolytic solution increased. The irreversible capacity increased. In a case where the specific surface area was too small, the composite material became larger in size, which made it difficult to produce an electrode. The values of the specific surface area were obtained by a BET method.

Preferably, the resin was a thermoplastic resin. Examples of the thermoplastic resin include polyvinyl alcohol (PVA), polyvinylbutyral (PVB), cellulose resin (carboxymethyl cellulose (CMC), etc.), polyolefin (polyethylene (PE), polypropylene (PP), etc.), ester resins (polyethylene terephthalate (PET), etc.), and acrylic (methacrylic) resins. As a matter of course, examples of the thermoplastic resin are not limited to the above listed examples. Because the resin is subjected to a pyrolytic decomposition process, preferable resin is of a type which does not generate a toxic gas during the pyrolytic decomposition process. Preferably, the resin was a water soluble-resin. The preferable resin in the above listed resins was polyvinyl alcohol resins. The most preferable resin was PVA. The use of PVA alone is preferred as a matter of course. In so far as the advantageous characteristic of the present invention is not deteriorated largely, the other resins also can be used. The resin also includes a resin containing PVA as a main component. "PVA as a main component" means "PVA content/whole resin content ≥50 wt %". Preferably, the PVA content is 60 wt % or more, more preferably, 70 wt % or more, further preferably, 80 wt % or more, especially preferably, 90 wt % or more. The reason why the PVA was the most preferable resin follows: With a decomposed product (thermolysis product) of PVA, a side reaction with an electrolytic solution of a lithium ion secondary battery hardly occurred. This involves decrease of an irreversible capacity. Further, the PVA is easily decomposed into water and carbon dioxide in the course of thermal decomposition. The remaining carbide is little. As a result, the Si content in the C—Si composite material is not lowered. For example, in a case where polyethylene glycol (molar weight of 20,000, produced by Wako Pure Chemical Industries, Ltd.) was used, a large amount of carbide was left during the modification (when heating) in comparison with a case where the PVA was used. As a result, the Si content was lowered. Further, the irreversible capacity was large. For example, the initial coulombic efficiency was low (43%). The cycle characteristic was low (32%).

Preferably, the PVA had an average molar weight (polymerization degree) of 2200-4000. More preferably, the average molar weight was 3000 or less. The polymerization degree was obtained according to the JIS K 6726. For example, the PVA of 1 part was dissolved in water of 100 parts. A viscosity (30° C.) was obtained by using the Ostowald Viscometer (relative viscometer). A polymerization degree ($P_A$) was obtained by the following equations (1) to (3).

$$\log(P_A) = 1.613 \times \log\{([\eta] \times 104)/8.29\} \quad \text{Equation (1)}$$

$$[\eta] = \{2.303 \times \log[\eta\text{rel}]\}/C \quad \text{Equation (2)}$$

$$[\eta\text{rel}] = t_1/t_0 \quad \text{Equation (3)}$$

where $P_A$: polymerization degree, $[\eta]$: intrinsic viscosity, $\eta$rel: relative viscosity, C: concentration of test solution (g/L), $t_0$: falling speed of water (s), and $t_1$: falling speed of test solution (s)

Preferably, the PVA had a saponification degree of 75-90 mol %. More preferably, a saponification degree was 80 mol % or higher. The saponification degree was obtained according to JIS K 6726. For example, according to an estimated saponification degree, a sample of 1-3 parts, water of 100 parts, and 3 drops of phenolphthalein are added to be completely dissolved. A NaOH aqueous solution of 25 ml (0.5 mol/L) was added, stirred, and left for 2 hours. A HCl aqueous solution of 25 ml (0.5 mol/L) was added. Titration was performed with the NaOH aqueous solution (0.5 mol/L). The saponification degree (H) was obtained by the following equations (1) to (3).

$$X_1 = \{(a-b) \times f \times D \times 0.06005\}/\{S \times (P/100)\} \times 100 \quad \text{Equation (1)}$$

$$X_2 = (44.05 \times X_1)/(60.05 - 0.42 \times X_1) \quad \text{Equation (2)}$$

$$H = 100 - X_2 \quad \text{Equation (3)}$$

where
$X_1$: acetic acid content corresponding to residual acetic group (%)
$X_2$: residual acetic group (mol %)
H: saponification degree (mol %)
a: amount of use of NaOH solution (0.5 mol/l) (ml)
b: amount of use of NaOH solution (0.5 mol/l) at blank test (ml)
f: factor of NaOH solution (0.5 mol/l)
D: concentration of normal solution (0.1 mol/l or 0.5 mol/l)
S: sampling amount (g)
P: pure content of sample (%)

The composite material may contain a C—Si composite material which does not have the above described characteristic. For example, if (volume of C—Si composite material having the characteristic of the present invention)/(volume of C—Si composite material having the characteristic of the present invention+volume of C—Si composite material not having the characteristic of the present invention)≥0.5 is satisfied, the characteristic of the present invention was not deteriorated largely. Preferably, the ratio is 0.6 or higher. More preferably, the ratio is 0.7 or higher. Further preferably, the ratio is 0.8 or higher. Still further preferably, the ratio is 0.9 or higher. The volume ratio is obtained by an electron microscope observation method or the like. From this point of view, the diameter can be regarded as an "average diameter". The length can be regarded as an "average length". The grain size can be regarded as an "average grain size".

The composite material is, for example, a negative electrode material for battery.

A second invention is directed to a negative electrode. The second invention is directed to, for example, a negative electrode for secondary battery. The negative electrode is made by using the above described composite material.

A third invention is directed to a secondary battery. The secondary battery includes the negative electrode.

A fourth invention is directed to a method for producing a carbon-silicon composite material. The producing method comprises (contains, includes) a dispersing liquid preparation step. The producing method comprises (contains, includes) a solvent removal step. The producing method comprises (contains, includes) a modification step. An example of the dispersing liquid preparation step comprises (contains, includes) a step in which a dispersing liquid comprising (containing) a resin, a carbon black, silicon, and a solvent is prepared. Another example of the dispersing liquid preparation step comprises (contains, includes) a step in which a dispersing liquid comprising (containing) a resin, silicon (having a grain size of 0.05-3 μm), and a solvent is prepared. The solvent removal step is a step in which a solvent is removed from the dispersing liquid. Accordingly, a C—Si composite material precursor can be obtained. The modification step is a step in which the C—Si composite material precursor is modified so as to be a C—Si composite material. Preferably, the producing method further comprises (contains, includes) a unraveling step. Preferably, the producing method still further comprises (contains, includes) a classification step.

Examples of the solvent removing method comprise (contain, include) a centrifugal spinning method (see, FIGS. 1 and 2), a spinning and drawing method (see, FIG. 3), an electrostatic spinning method, and a gel solidifying and spinning method. Further examples of the solvent removing method include a method for obtaining a fiber shaped C—Si composite material precursor by spinning the dispersing liquid, a method for obtaining a film shaped C—Si composite material precursor by coating and drying the dispersing liquid on a base material, and a method for obtaining a spherical shaped C—Si composite material precursor by dropping the dispersing liquid into a PVA insoluble solvent having a good compatibility with the dispersing liquid.

In a case where the centrifugal spinning method or the electrostatic spinning method is employed, a nonwoven fabric can be obtained. In a case where the spinning and drawing method is employed, for example, a yarn (or a fiber (long fiber)) can be obtained. What can be obtained by the above described spinning methods is a fiber material (e.g., nonwoven fabric, yarn, or filament (monofilament or multifilament)). A fiber of the fiber material is a C—Si composite material precursor. A preferable spinning method was a spinning and drawing method (especially preferably, a stretching ratio of 2-50 folds). The other preferable spinning method was a centrifugal spinning method (especially preferably, the disk spinning number of 1000-100000 rpm).

The modification step is a step in which the C—Si composite material precursor is modified so as to be a C—Si composite material. The step is basically a heating step. In the heating step, the composite material precursor is heated to a temperature of, for example, 50-3000° C. Preferable temperature was 100° C. or higher. More preferable temperature was 500° C. or higher. Preferable temperature was 1500° C. or lower. More preferable temperature was 1000° C. or lower. Because the PVA has a thermal decomposition temperature that is lower than a melting point thereof, the PVA can be modified while keeping the shape of the composite material precursor.

The unraveling step is a step in which the composite material is unraveled. In a case where the composite material is a nonwoven fabric, the nonwoven fabric is decomposed by the unraveling step to be a single fiber. As a matter of course, there still remains a tangled fiber. A yarn is also decomposed. A long finger is cut. The long fiber becomes a short fiber. A sheet becomes particles. A particle becomes a smaller particle. The unraveling step is, for example, a grinding step. The unraveling step is, for example, a striking step. The unraveling step is, for example, a cutting step. In the cutting step, for example, a fiber is cut.

The classification step is a step in which a C—Si composite material of a predetermined size is obtained. The classification step is, for example, a sieving step. The classification step is, for example, an air flow classification step.

The resin, the carbon black, and the Si particle are as described above.

Preferably, concentration of the resin (e.g., PVA) in the dispersing liquid was 50-200 g/L. More preferably, the concentration was 60 g/L or higher. Further preferably, the concentration was 150 g/L or lower.

Preferably, concentration of CB in the dispersing liquid was 1-100 g/L. More preferably, the concentration was 2 g/L or higher. Further preferably, the concentration was 20 g/L or lower.

Preferably, the CB was 1-60 pts.mass based on the PVA of 100 pts.mass. More preferably, the CB was 2 pts.mass or more. Further preferably, the CB was 50 pts.mass or less.

Preferably, concentration of the Si particle was 10-100 g/L. More preferably, the concentration was 30 g/L or higher. Further preferably, the concentration was 90 g/L or lower.

Preferably, viscosity of the dispersing liquid (dispersing liquid after the dispersing liquid preparation step: dispersing liquid before being supplied to the solvent removal step) was 10-10000 mPa·S. The viscosity was measured by a coaxial double cylinder type viscometer. Preferably, the dispersing liquid had solid component concentration of 0.1-50 mass %.

Hereinafter, more detailed description follows.

[Dispersing Liquid Preparation Step (Step I)]

A dispersing liquid comprises, for example, a resin, silicon, and a solvent. Specially preferably, the dispersing liquid further comprises a carbon black.

A description is made provided that the resin is PVA. Descriptions are made provided that the other resins are also PVA.

Preferably, the PVA had a polymerization degree of 2200-4000 from a spinning point of view. More preferably, the polymerization degree was 3000 or lower. Preferably, a saponification degree was 75-90 mol %. More preferably, the saponification degree was 80 mol % or higher. In a case where the polymerization degree was too small, a yarn was susceptible to cutting at spinning. In a case where the polymerization degree was too large, spinning was hardly performed. In a case where the saponification degree was too low, the PVA was hardly soluble in water and spinning was hardly performed. In a case where the saponification degree was too large, viscosity was high and spinning was hardly performed.

The dispersing liquid may contain, as required, one or two or more selected from the group including vinyl resin (e.g., polyvinyl alcohol-based copolymer, polyvinylbutyral (PVB), etc.), polyethylene oxide (PEO), acrylic resin (e.g., polyacrylic acid (PAA), polymethyl methacrylate (PMMA), polyacrylonitrile (PAN), etc.), fluororesin (e.g., polyvinylidene difluoride (PVDF), etc.), naturally-occurring polymers (e.g., cellulose resin, cellulose derivative resins (polylactic acid, chitosan, carboxymethyl cellulose (CMC), hydroxyethyl cellulose (HEC), etc.)), engineering plastic resin (polyether sulfone (PES), etc.), polyurethane resin (PU), polyamide resin (nylon), aromatic polyamide resin (aramid resin), polyester resin, polystyrene resin, and polycarbonate resin. Any amount thereof may be acceptable in so for as an advantageous effect of the present invention is not deteriorated.

Specially preferably, the dispersing liquid comprises (contains) a CB having a primary particle size (average primary particle size) of 21-69 nm. In a case where a CB having a primary particle size of less than 21 nm is used, a specific surface area of the obtained carbon fiber increases. A bulk density, however, was lowered. A solid component concentration of a dispersing liquid did not increase and thus there was a difficulty in treating the dispersing liquid. In a case where a CB having a primary particle size beyond 69 nm was used, a specific surface area of the obtained carbon fiber became smaller. There was large contact resistance. In a case where a primary particle size of the CB particle was too large, the cycle characteristic showed a lowering trend. In a case where a primary particle size of the CB particle was too small, the cycle characteristic showed a lowering trend.

The solvent is selected one or two or more from the group including water, alcohol (e.g., methanol, ethanol, propanol, butanol, isobutyl alcohol, amyl alcohol, isoamyl alcohol, cyclohexanol, etc.), ester (e.g., ethyl acetate, butyl acetate, etc.), ether (e.g., diethyl ether, dibutyl ether, tetrahydrofuran, etc.), ketone (acetone, methyl ethyl ketone, methyl isobutyl ketone, etc.), aprotic polar solvent (e.g., N,N-dimethylformamide, dimethylsulfoxide, acetonitrile, dimethylacetamide, etc.), halogenated hydrocarbon (e.g., chloroform, tetrachloromethane, hexafluoroisopropyl alcohol, etc.), and acid (acetic acid, formic acid, etc.). Preferably, from an environmental perspective, the solvent was water or alcohol. Specially preferably, the solvent was water.

The dispersing liquid comprises (contains) the Si particle. The Si particle (metal silicon particle) substantially is an elemental silicon (silicon simple substance). "Substantially" means that the following cases are also included: a case where impurities are contaminated during a process; and a case where impurities are contaminated when a particle surface is oxidized while being kept in a container. The particle of the present invention may be any particle that contains elemental silicon. For example, the particle surface may be covered with other component. Alternatively, the particle may have such a structure that an elemental silicon is dispersed in a particle made of another component. For example, there is a Si particle covered with a carbon. For example, there is a Si particle dispersed in $SiO_2$. In a case of the composite particle, it is sufficient that a grain size of the composite particle falls within the above described range. Whether the Si component contained in the carbon fiber is a simple substance or a chemical compound can be determined by a publicly known measurement method such as X-ray diffraction measurement (MUD).

From an aspect of strength and conductivity, the dispersing liquid may comprise (contain) a carbon nanotube (e.g., single-wall carbon nanotube (SWNT), multi-wall carbon nanotube (MWNT), and mixture thereof), etc., as required.

The dispersing liquid comprises (contains) dispersant, as required. The dispersant is, for example, a surfactant. Both a low molecular weight surfactant and a high molecular weight surfactant may be employed.

Preferably, the PVA (resin) and the Si are mixed at the following ratio. If a PVA content is too large, a Si content decreases. Conversely, if a PVA content is too small, the solvent removal step such as spinning and coating becomes difficult to be performed. Therefore, a preferable ratio was the Si of 5-200 pts.mass (more preferably, 10-100 pts.mass) based on the PVA of 100 pts.mass.

In a case where the CB is contained, a preferable ratio was [mass of the Si particle]/[mass of the CB+mass of the Si particle]=20-94%. Alternatively, a preferable total mass of the particle and the CB was 5-200 pts.mass (more preferably, 10-100 pts.mass) based on the PVA of 100 pts.mass. In a case where the mass of the CB was too large, a capacity as a negative electrode active material was lowered. In a case where the mass of the CB was too small, the conductivity was lost.

In a case where concentration of solid component (component other than solvent) in the dispersing liquid was too high, the solvent removal step such as spinning was difficult to be performed. Conversely, in a case where concentration was too low, the solvent removal step such as spinning was also difficult to be performed. Preferable concentration of the solid component was 0.1-50 mass % (more preferable concentration was 1-30 mass %, further preferable concentration was 5-20 mass %). In a case where viscosity of the dispersing liquid was too high, for example, if spinning was employed as the solvent removal step, the dispersing liquid was hardly discharged through a nozzle at spinning. Conversely, in a case where viscosity was too low, spinning was difficult to be performed. Therefore, a preferable viscosity (viscosity at spinning: measured by a coaxial double cylinder type viscometer) of the dispersing liquid was 10-10000 mPa·S (more preferable viscosity was 50-5000 mPa·S, further preferable viscosity was 500-5000 mPa·S).

The dispersing liquid preparation step comprises, for example, a mixing step and a fining step. The mixing step is a step in which the PVA and the Si (and the CB) are mixed. The fining step is a step in which the Si (and the CB) is micronized. The fining step is a step in which the Si (and the CB) is applied with a shear force. Accordingly, the CB is decomposed because a secondary flocculation is broken up. It is no matter which step is performed first, the mixing step or the fining step. Both may be performed concurrently.

In the mixing step, there are a case where both the PVA and the Si (and the CB) are fine particles (solid state), a case where one is a fine particle and the other is a solution (dispersing liquid), and a case where both are solutions (dispersing liquids). To enhance operability, preferable case is a case where both the PVA and the Si (and the CB) are solutions (dispersing liquids).

In the fining step, for example, a medialess bead mill is employed. Alternatively, a bead mill is employed. Further alternatively, an ultrasonic irradiation apparatus is employed. Preferably, in order to be free from contamination of foreign matter, a medialess bead mill is employed. Preferably, in order to control a grain size of Si (and CB), a bead mill is employed. Preferably, in order to perform the step with a simple operation, an ultrasonic irradiation apparatus is employed. In the present invention, because a control of a grain size of Si (and CB) was a material point, a bead mill was employed.

[Solvent Removal Step: Spinning Step (Producing Step of Fiber Material (Carbon-Silicon Composite Fiber Precursor): Step II)]

The solvent removal step is a step in which a solvent is removed from the dispersing liquid. Specially, a step of obtaining a fiber shaped composite material precursor (carbon-silicon composite fiber precursor) in solvent removal steps is referred to as a spinning step.

Figure 1:
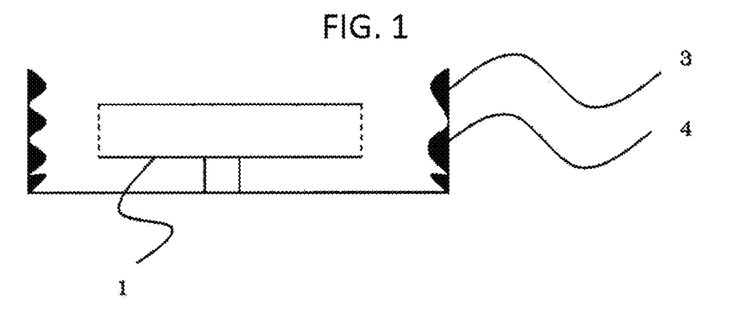
FIG. 1 is a side view schematically illustrating a centrifugal spinning apparatus.
Figure 2:
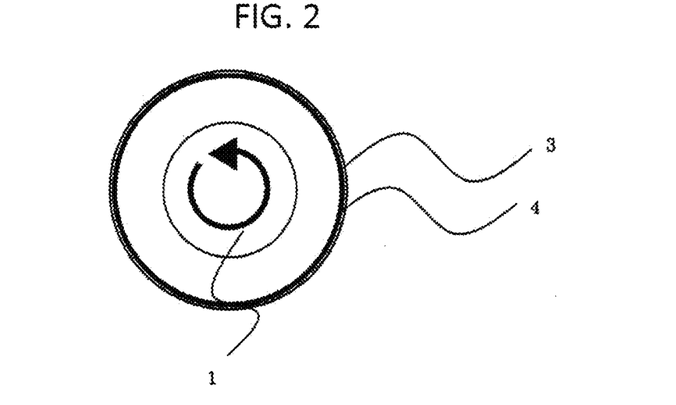
FIG. 2 is a top view schematically illustrating the centrifugal spinning apparatus.

A centrifugal spinning apparatus of FIGS. 1 and 2 was employed for the spinning step. FIG. 1 is a schematic side view of a centrifugal spinning apparatus. FIG. 2 is a schematic top view of the centrifugal spinning apparatus. In the drawings, 1 denotes a spinning body (disk). The disk 1 is formed into a hollow body. A nozzle (or a hole) is provided on/in a wall of the disk 1. A spinning dope is charged into an inside (hollow portion) 2 (not shown) of the disk 1. The disk 1 is rotated at high speed. Accordingly, the spinning dope is drawn by a centrifugal force. Then, the spinning dope deposits on a collection plate 3 while the solvent is volatilized. A nonwoven fabric 4 is formed by the deposition.

A centrifugal spinning apparatus may have a heating device for heating the disk 1. A centrifugal spinning apparatus may have a spinning dope continuously supplying device. A centrifugal spinning apparatus is not limited to what are illustrated in FIGS. 1 and 2. For example, the disk 1 may be a vertical disk. Alternatively, the disk 1 may be fixed on a top of a centrifugal spinning apparatus. The disk 1 may be a bell type disk or a pin type disk which are used in a publicly known spray drying device. The collection plate 3 is not necessarily be a batch type collection plate but may be a continuous type collection plate. The collection plate 3 may be an inverse conical shaped cylinder that is used in a publicly known spray drying device. Heating of the entire solvent evaporating space is preferred because the solvent dries quickly. Preferably, a spinning rate (angle rate) of the disk 1 was 1,000-100,000 rpm. More preferably, the spinning rate was 5,000-50,000 rpm. This is because, in a case where the speed is too late, a stretching ratio becomes low. Higher speed is more preferred. However, the speed exceeding a certain upper limit value cannot achieve any greater improvement. Conversely, higher speed applied a larger load to the apparatus. Therefore, a preferable speed was set to 100,000 rpm or lower. In a case where a distance between the disk 1 and the collection plate 3 is too short, a solvent is hardly evaporated. Conversely, in a case where the distance is too long, the apparatus becomes larger more than required. A preferable distance differs according to a size of apparatus. In a case where a diameter of the disk was 10 cm, a distance between the disk 1 and the collection plate 3 was, for example, from 20 cm to 3 m.

Figure 3:
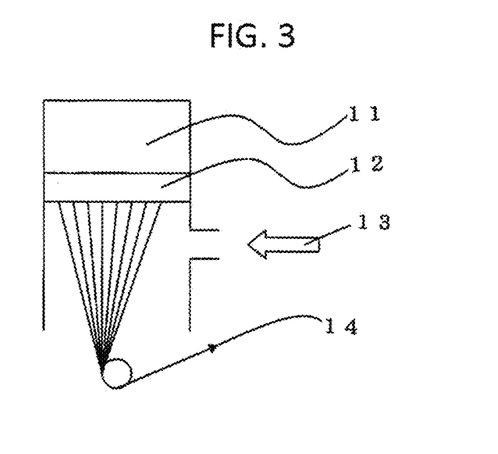
FIG. 3 is a schematic view of a yarn spinning and drawing apparatus.

Instead of the centrifugal spinning apparatus, a spinning and drawing apparatus may be employed. FIG. 3 is a schematic view illustrating a drying type spinning and drawing apparatus. Here, a drying type spinning and drawing apparatus is exemplified, but a wetting type spinning and drawing apparatus may be employed. A drying type spinning and drawing method is a method in which solidification is performed in the air. A wetting type spinning and drawing method is a method in which solidification is performed in a polyvinyl alcohol insoluble solvent. Both methods are employable. In FIG. 3, 11 denotes a tank (a tank of dispersing liquid (polyvinyl alcohol, a carbon black (a primary particle size of 21-69 nm), and a solvent are contained). 12 denotes a spinning nozzle. A dispersing liquid in the tank 11 is subjected to spinning via a spinning nozzle 12. At the time, a solvent is evaporated by heated air 13. The resulting dispersing liquid is wound as a yarn 14. In a wetting type spinning and drawing method, instead of the heated air, a polyvinyl alcohol insoluble solvent is employed. In a case where a stretching ratio is too large, a yarn is cut. In a case where a stretching ratio is too small, a fiber diameter does not become small. A preferable stretching ratio was 2-50 folds. More preferable stretching ratio is 3 folds or larger. Further preferable stretching ratio is 20 folds or smaller. In the present step, a carbon fiber precursor made-long fiber (yarn) can be obtained.

In the spinning and drawing method and the centrifugal spinning method, liquid having high viscosity (dispersing liquid having high solid component concentration) could be employed in comparison with a dispersing liquid employed in the electrostatic spinning method. The centrifugal spinning method is hardly affected by humidity (temperature) when compared with the electrostatic spinning method. Stable spinning could be performed for a long time. Productivity was high in the spinning and drawing method and the centrifugal spinning method. The centrifugal spinning method is a spinning method utilizing a centrifugal force. Therefore, a stretching ratio at spinning is high. Maybe, for this reason, an orientation of carbon particles in fiber was high. Conductivity was high. A diameter of thus obtained carbon fiber was small. Variation of fiber diameter was small. Contamination of metal powder was little. In a case of nonwoven fabric, a surface area was large.

The fiber material obtained in the present step (spinning step) is made of a composite material precursor. The precursor is a mixture of PVA and Si particle (preferably, CB is further contained). A plurality of nonwoven fabrics (made of the precursor) may be laminated. The laminated nonwoven fabric may be compressed by a roll, etc. A thickness and density are controlled, as required, by being compressed. A yarn (filament) may be wound around a bobbin.

A nonwoven fabric (made of a fiber precursor) is separated from a collector to be treated. Alternatively, the nonwoven fabric is treated while leaving it on a collector. Further alternatively, thus generated nonwoven fabric may be wound up around a stick in a manner similar to cooking of a cotton candy.

In a case of obtaining a fiber shaped composite material, a gel solidifying and spinning method can be employed in addition to the centrifugal spinning method, the spinning and drawing method, and the electrostatic spinning method.

In a case of obtaining a spherical shaped composite material, the following methods are also employable: a method for obtaining a film shaped C—Si composite material precursor by coating the dispersing liquid on a base material such as a polyester film or a release paper by means of a bar coater, a die coater, a kiss coater, a roll coater, etc., followed by drying thereof and a method for obtaining a spherical shaped C—Si composite material precursor by dropping the dispersing liquid into a PVA insoluble solvent that has a good compatibility with the solvent for coagulation thereof.

[Modification Step (Step III)]

The modification step is a step in which the composite material precursor is modified so as to be a C—Si composite material.

The step is basically a heating step. In the heating step, the composite material precursor is heated to, for example, 50-3000° C. More preferable temperature was 100° C. or higher. Further preferable temperature was 500° C. or higher. Further preferable temperature was 1500° C. or lower. Still further preferable temperature was 1000° C. or lower.

A thermal decomposition temperature of PVA is lower than a melting point thereof. Therefore, a shape of the precursor can be held after heating process.

[Unraveling Step (Step IV)]

The present step is a step in which a size of the composite material obtained in the above step is reduced. The present step is a step in which the composite material precursor (composite material) obtained in, for example, the Step II (or, the Step III) is unraveled. A pulverization (An unraveling) provides smaller composite material precursor (composite material). Striking of the fiber material also can decompose the fiber material. More specifically, striking also can provide a fiber.

A cutter mill, a hammermill, a pin mill, a ball mill, or a jet mill can be used for pulverization (unraveling). Both a wet type method and a dry type method can be employed. However, for the use in a nonaqueous electrolytic secondary battery, a dry type method is preferred.

A medialess mill will prevent a fiber from being collapsed. Therefore, a medialess mill is preferred to be employed here. For example, a cutter mill and an air jet mill are also preferred to be employed here.

Conditions of the present Step IV affect a length and a grain size of a carbon fiber.

[Classification Step (Step V)]

The present step is a step in which a fiber of a desired size is selected from the fibers obtained in the Step IV. For example, a composite material which has passed through a sieve (mesh size of 20-300 μm) is used. In a case where a sieve having a small mesh size is used, a ratio of composite material which is not used becomes large. This involves increase of cost. In a case where a sieve having a large mesh size is used, a ratio of composite material which is used becomes large. In this case, however, quality of composite material varies. Other methods equivalent to using a sieve may also be used. For example, an airflow classifier (cyclone classifier) may also be used.

[Electrode]

The composite material is used as a material for electric element (including electron element). For example, the composite material is used as an active material of a negative electrode for lithium ion battery. The composite material is used as an active material of a negative electrode for lithium ion capacitor.

A lithium ion battery is made of various members (e.g., positive electrode, negative electrode, separator, and electrolytic solution). A positive electrode (or negative electrode) is formed in a manner as follows. A mixture including an active material (positive electrode active material or negative electrode active material), a conductive agent, a binder, etc. is laminated on a current collector (e.g., aluminum foil or copper foil). Accordingly, a positive electrode (or negative electrode) can be obtained.

The composite material of the present invention may be used alone as a negative electrode active material, or may be used with a publicly known negative electrode active material. In a case of a combined use, preferably, (content of the composite material)/(total content of the active material) is 3-50 mass %. More preferably, the ratio was 5 mass % or higher. Further preferably, the ratio was 10 mass % or higher. Further preferably, the ratio was 30 mass % or lower. Still further preferably, the ratio was 20 mass % or lower. Examples of the publicly known negative electrode active material include hardly graphitizable carbon, easily graphitizable carbon, graphite, pyrolytic carbons, cokes, glassy carbons, organic macromolecule chemical compound fired body, carbon fiber, or activated carbon. Examples of the publicly known negative electrode active material further include at least one selected from a group including a simple substance, alloy, and chemical compound of a metallic element capable of forming lithium alloy, a simple substance, alloy, and chemical compound of a semimetal element capable of forming lithium alloy (hereinafter referred to as "alloy system negative electrode active material").

Examples of the metallic element (or semimetal element) include tin (Sn), lead (Pb), aluminum, Indium (In), silicon (Si), zinc (Zn), antimony (Sb), bismuth (Bi), cadmium (Cd), magnesium (Mg), boron (B), gallium (Ga), germanium (Ge), arsenic (As), silver (Ag), zirconium (Zr), yttrium (Y), or hafnium (Hf). Specific examples of chemical compound include LiAl, AlSb, CuMgSb, $SiB_4$, $SiB_6$, $Mg_2Si$, $Mg_2Sn$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SiO_v$ (0<v≤2), $SnO_w$ (0<w≤2), $SnSiO_3$, LiSiO, and LiSnO. A lithium-titanium composite oxide (spinel type, ramsdellite type, etc.) is also preferred.

The positive electrode active material may be any substance that can occlude and emit lithium ion. Preferable examples thereof include a lithium-containing complex metal oxide and olivine type lithium phosphate.

The lithium-containing complex metal oxide is a metal oxide containing lithium and a transition metal. Alternatively, the lithium-containing complex metal oxide is a metal oxide in which a transitional metal is partially replaced with heteroelement. Preferably, the transition metal element comprises (contains, includes) at least one selected from the group including cobalt, nickel, manganese, and iron. Specific examples of the lithium-containing complex metal oxide include $Li_kCoO_2$, $Li_kNiO_2$, $Li_kMnO_2$, $Li_kCo_mNi_{1-m}O_2$, $Li_kCo_mM_{1-m}O_n$, $Li_kNi_{1-m}M_mO_n$, $Li_kMn_2O_4$, $Li_kMn_{2-m}MnO_4$, (M is at least one element selected from the group including Na, Mg, Sc, Y, Mn, Fe, Co, Ni, Cu, Zn, Al, Cr, Pb, Sb, and B. k=0-1.2, m=0-0.9, n=2.0-2.3).

The lithium-containing complex metal oxide has an olivine type crystal structure and can be a chemical compound (lithium iron phosphorus oxide) represented by a general formula of $Li_xFe_{1-y}M_yPO_4$ (M is at least one element selected from the group including Co, Ni, Cu, Zn, Al, Sn, B, Ga, Cr, V, Ti, Mg, Ca, and Sr. 0.9<x<1.2, 0≤y<0.3). For example, $LiFePO_4$ is suitable as such lithium iron phosphorus oxide.

As lithium thiolate, a chemical compound represented by a general formula of X—S—R—S—(S—R—S)n-S—R—S—X' that is disclosed in EP Patent No. 415856 is employed.

In a case where a carbon fiber containing lithium thiolate and sulfur is used as a positive electrode active material, because the active material itself does not contain lithium ion, an electrode containing lithium such as a lithium foil is preferred as a counter electrode.

A separator is made of a porous film. A separator may be a laminated body made of two or more porous films. An example of the porous film includes a synthetic resin (e.g., polyurethane, polytetrafluoroethylene, polypropylene, and polyethylene) made-porous film. Also, a ceramic made-porous film may be employed.

An electrolytic solution contains a nonaqueous solvent and an electrolyte salt. Examples of the nonaqueous solvent include cyclic carbonic ester (propylene carbonate, ethylene carbonate, etc.), aliphatic ester (diethyl carbonate, dimethyl carbonate, ethyl methyl carbonate, etc.), and ethers (γ-butyrolactone, sulfolane, 2-methyltetrahydrofuran, dimethoxyethane, etc.). They can be used alone or in combination (two or more). From the perspective of oxidation stability, the carbonic acid ester is preferred.

Examples of the electrolyte salt include $LiBF_4$, $LiClO_4$, $LiPF_6$, $LiSbF_6$, $LiAsF_6$, $LiAlCl_4$, $LiCF_3SO_3$, $LiCF_3CO_2$, LiSCN, lower aliphatic carboxylic acid lithium, LiBCl, $LiB_{10}Cl_{10}$, halogenated lithium (LiCl, LiBr, LiI, etc.), borate salts (bis(1,2-benzenediolate(2-)-O, O') lithium borate, bis (2,3-naphthalenediolate (2-)-O, O') lithium borate, bis(2,2'-biphenyldiolate(2-)-O, O') lithium borate, bis(5-fluoro-2-oleate-1-benzenesulfonic acid-O, O') lithium borate, etc.), and imide salts ($LiN(CF_3SO_2)_2$, $LiN(CF_3SO_2)(C_4F_9SO_2)$, etc.). Lithium salt such as $LiPF_6$, $LiBF_4$ are preferred. $LiPF_6$ is specially preferred.

As an electrolytic solution, a gel electrolyte in which an electrolytic solution is held in a high-molecular compound may be employed. Examples of the high-molecular compound include polyacrylonitrile, polyvinylidene fluoride, copolymer of polyvinylidene fluoride and polyhexafluoropropylene, polytetrafluoroethylene, polyhexafluoropropylene, polyethylene oxide, polypropylene oxide, polyphosfazen, polysiloxane, polyvinyl acetate, polyvinyl alcohol, polymethyl methacrylate, polyacrylic acid, polymethacrylic acid, styrene-butadiene rubber, nitrile butadiene rubber, polystyrene, and polycarbonate. From the perspective of electrochemical stability, a high-molecular compound having a structure equivalent to polyacrylonitrile, polyvinylidene fluoride, polyhexafluoropropylene, or polyethylene oxide is preferred.

Examples of the conductive agent include graphite (natural graphite, artificial graphite, etc.), carbon black (acetylene black, ketjen black, channel black, furnace black, lampblack, thermal black, etc.), conductive fiber (carbon fiber, metallic fiber), metal (Al, etc.) powder, conductive whisker (zinc oxide, potassium titanate, etc.), electroconductive metallic oxide (titanium oxide, etc.), organic conductive material (phenylene derivative, etc.), and carbon fluoride.

Examples of the binder include polyvinylidene fluoride, polytetrafluoroethylene, polyethylene, polypropylene, aramid resin, polyamide, polyimide, polyamide imide, polyacrylonitrile, polyacrylic acid, poly(methyl acrylate), poly(ethyl acrylate), polyacrylic acid hexyl, polymethacrylic acid, polymethyl methacrylate, polyethyl methacrylate, poly(hexyl methacrylate), polyvinyl acetate, polyvinyl pyrrolidone, polyether, polyether sulphone, hexafluoro-polypropylene, styrene-butadiene rubber, modified acryl rubber, and carboxymethyl cellulose.

Hereinafter, substantial examples are listed. The present invention, however, will not be restricted to the following examples. In so far as the characteristic of the present invention would not be degraded largely, various deformation examples and application examples will also be included in the present invention.

Example 1

PVA (product name: POVAL 224, saponification degree: 88 mol %, polymerization degree: 2400, produced by KURARAY CO., LTD.) of 60 pts.mass, carbon black (primary particle size: 35 nm, iron: 1 ppm) of 5 pts.mass, metallic Si (average grain size: 0.4 μm, produced by: KINSEI MATEC CO., LTD.) of 35 pts.mass, and water of 500 pts.mass were mixed by means of a bead mill. A carbon black-metallic Si dispersing liquid (PVA was dissolved) could be obtained.

A centrifugal spinning apparatus (see, FIGS. 1 and 2, distance between nozzle and collector: 20 cm, disk spinning number: 10,000 rpm) was used. The dispersing liquid was used to perform spinning (dehydration) by means of the centrifugal spinning apparatus. A nonwoven fabric (C—Si composite material precursor) was formed on a collection plate.

The obtained nonwoven fabric was heated (800° C., 1 hour, in a reducing atmosphere).

The obtained nonwoven fabric (C—Si composite material) was processed by using a mixer. Accordingly, pulverization (unraveling) was performed. As a result, a fiber shaped C—Si composite material was obtained.

The obtained fiber shaped C—Si composite material was classified. A sieve (mesh size: 75 μm) was used for the classification.

Figure 4:
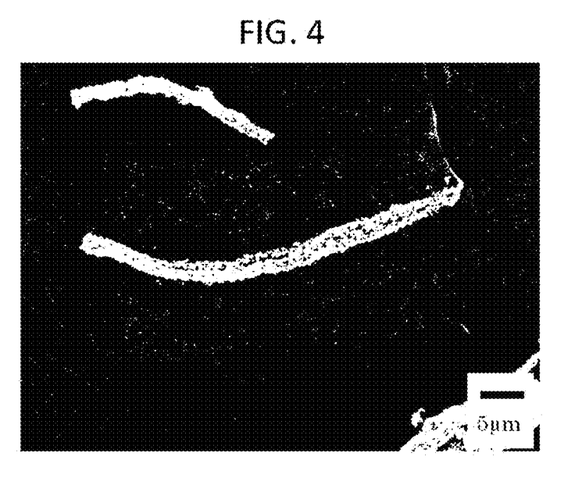
FIG. 4 is a SEM picture

The obtained fiber shaped C—Si composite material was measured by means of a scanning electron microscope (VHX-D500 produced by KEYENCE CORPORATION). A result thereof is shown in FIG. 4. The C—Si composite material obtained in the present example had a fiber shape (diameter: 2 μm, length: 40 μm, a larger fiber at the center in FIG. 4).

Figure 5:
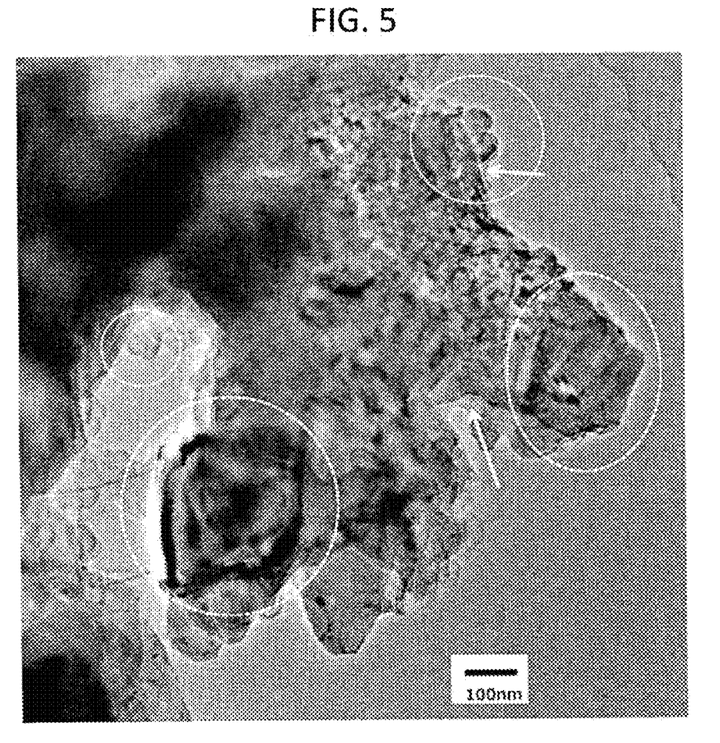
FIG. 5 is a TEM picture.
Figure 6:
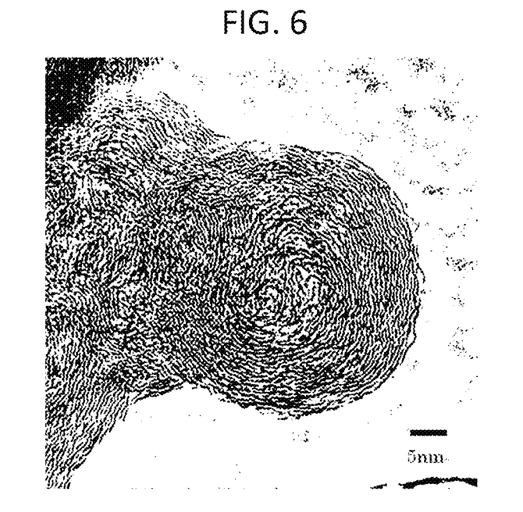
FIG. 6 is a TEM picture.
Figure 7:
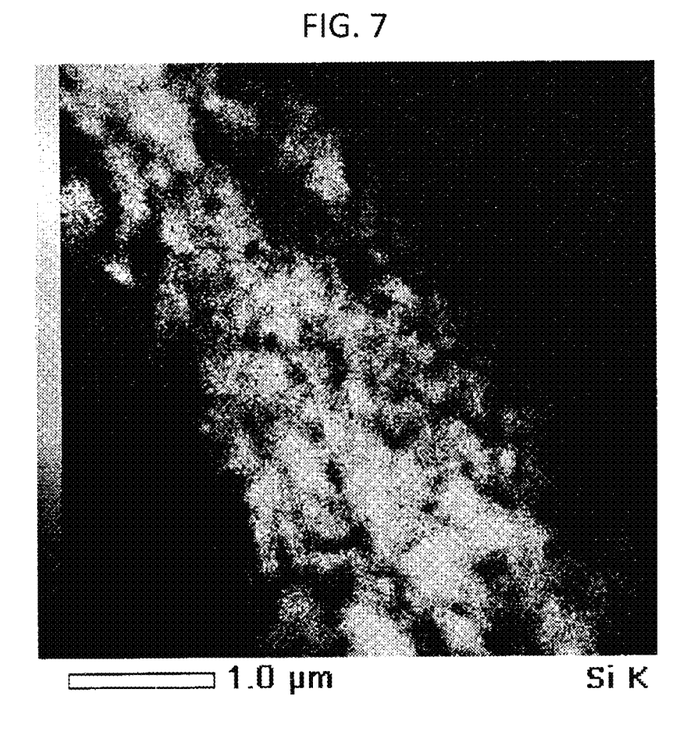
FIG. 7 is a TEM mapping drawing.

The obtained fiber shaped C—Si composite material was measured by means of a transmission electron microscope (JEM-ARM200F produced by JEOL Ltd.). Electron microscope pictures are shown in FIGS. 5 and 6, and an Si mapping drawing is shown in FIG. 7. FIGS. 5 and 6 include pictures of a part of a fiber. A carbon black having a primary particle size of 35 nm could be confirmed (see, FIG. 6). An Si particle having an average grain size of 0.4 μm could be confirmed (see, FIG. 7). A almost diamond shaped part encircled by a dotted line is a part of Si particle. A almost spherical shaped part encircled by a solid line is a part of CB. A part, indicated by an arrow, that does not have a diamond shape or spherical shape, is a part of PVA thermolysis product. Binding between Si particle and CB via PVA thermolysis product could be confirmed. A state that a surface of Si particle was covered by PVA thermolysis product could be confirmed.

A carbon/silicon analysis device (EMIA-920V2 produced by HORIBA, Ltd.) was used to perform carbon/silicon analysis. A carbon component was 35 mass %. A silicon component was 65 mass %.

A specific surface area (BET method, BELSORP-max-N-VP produced by Japan BEL Corp.) was 12 m²/g.

The C—Si composite material of 20 pts.mass, artificial graphite of 74 pts.mass, carboxymethyl cellulose of 2 pts.mass, and styrene-butadiene copolymer particle of 4 pts.mass were dispersed in water of 400 pts.mass. The resulting dispersing liquid was applied to a surface of a copper foil. The copper foil was dried and pressed. A lithium ion battery negative electrode could be obtained. A weight and a film thickness of the obtained electrode were measured. An electrode density was 1.60 g/cm². A lithium foil (counter electrode) was used. Ethylene carbonate/diethylenecarbonate (1/1 (volume ratio): electrolytic solution) was used. LiPF₆ (electrolyte) of 1 mol % was used. A coin cell for lithium ion battery was produced.

Figure 8:
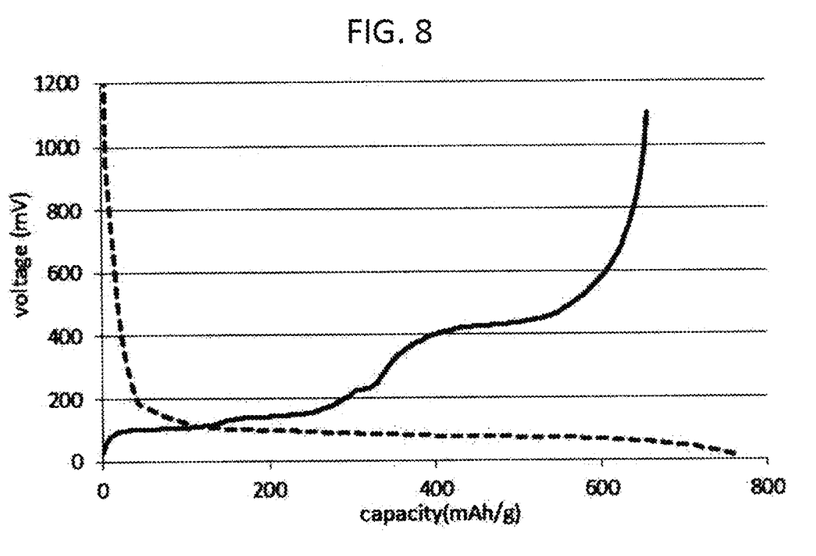
FIG. 8 is a charge and discharge graph.

The coin cell was charged and discharged with constant current (charge and discharge rate: 0.1 C). A discharge capacity was measured. A charge and discharge curve is shown in FIG. 8. A discharge capacity was 657 mAh/g, and an irreversible capacity was 86%. The discharge capacity after repeated 20 times charge and discharge was 598 mAh/g. A cycle characteristic (ratio of a discharge capacity after 20 cycles based on an initial discharge capacity) was 91%. A result thereof is shown in Table-1.

Example 2

Example 2 was performed in a manner similar to that performed in Example 1 except that PVA (saponification degree: 98 mol %, polymerization degree: 2400) of 60 pts.mass, carbon black (primary particle size: 50 nm), and metallic Si (average grain size: 2 μm) were used. A C—Si composite material similar to that obtained in Example 1 could be obtained. The C—Si composite material obtained in the present example was a fiber shaped C—Si composite material (diameter: 5 μm, length: 55 μm). Other characteristics are shown in Table-1.

Example 3

Example 3 was performed in a manner similar to that performed in Example 1 except that carbon black (primary particle size: 35 nm) of 32 pts.mass and metallic Si (average grain size: 0.1 μm) of 8 pts.mass were used. A C—Si composite material similar to that obtained in Example 1 could be obtained. The C—Si composite material obtained in the present example was a fiber shaped C—Si composite material (diameter: 0.5 μm, length: 5 μm). Other characteristics are shown in Table-1.

Example 4

A carbon black (primary particle size: 35 nm) of 1 pts.mass and a metallic Si (average grain size: 0.4 μm) of 39 pts.mass were used. A nonwoven fabric (made of a fiber shaped C—Si composite material) obtained after heating was pulverized (unraveled) into powder by means of a jet mill. Except for the above, the present example was performed in a manner similar to that performed in Example 1. A C—Si composite material similar to that obtained in Example 1 could be obtained. The C—Si composite material obtained in the present example had an approximately spherical shape (diameter: 4 μm). Other characteristics are shown in Table-1.

Example 5

PVA (saponification degree: 88 mol %, polymerization degree: 2400) of 60 pts.mass, carbon black (primary particle size: 23 nm) of 5 pts.mass, metallic Si (average grain size: 0.4 μm) of 35 pts.mass, and water of 500 pts.mass were mixed by means of a bead mill. A carbon black metallic silicon dispersing liquid (PVA was dissolved) was obtained.

The dispersing liquid was applied to a surface of a release paper (film thickness after dried: 15 μm). The release paper was dried at 120° C. for 10 min. Accordingly, a sheet (fiber shaped C—Si composite material precursor) could be obtained.

The obtained sheet was heated (800° C., 1 hour, in a reducing atmosphere).

The obtained sheet (fiber shaped C—Si composite material) was pulverized (unraveled) into powder by means of a jet mill. Accordingly, a C—Si composite material similar to that obtained in Example 1 could be obtained. The C—Si composite material obtained in the present example had an approximate spherical shape (diameter: 15 μm). The present example was performed by using the C—Si composite material in a manner similar to that performed in Example 1. Other characteristics are shown in Table-1.

Example 6

PVA (saponification degree: 88 mol %, polymerization degree: 2400) of 60 pts.mass, carbon black (primary particle size: 35 nm) of 5 pts.mass, metallic Si (average grain size: 0.4 μm) of 35 pts.mass, and water of 500 pts.mass were mixed by means of a bead mill. A carbon black-metallic silicon dispersing liquid (PVA was dissolved) could be obtained.

The dispersing liquid was dropped into stirred isopropyl alcohol. The obtained deposit was recovered by a sieve. The resulting substance was subjected to drying at a temperature of 120° C. for 10 min. to remove a solvent.

The obtained fine particle (C—Si composite material precursor) was heated (800° C., 1 hour, in a reducing atmosphere).

The obtained fine particle (C—Si composite material) was pulverized (unraveled) into powder by means of a jet mill. Accordingly, a C—Si composite material similar to that obtained in Example 1 could be obtained. The C—Si composite material obtained in the present example had an approximate spherical shape (diameter: 2 μm). The present example was performed by using the C—Si composite material in a manner similar to that performed in Example 1. Other characteristics are shown in Table-1.

Example 7

The present example was performed in a manner similar to that performed in Example 1 except that PVA (saponification degree: 88 mol %, polymerization degree: 2400) of 80 pts.mass, metallic Si (average grain size: 0.4 μm) of 20 pts.mass, and water of 500 pts.mass were used. A CB was not used in the present example. The composite material obtained in the present example was a Si particle whose surface was covered by a PVA thermolysis product. A composite material obtained in the present example had a fiber shape (diameter: 4 μm, length: 45 μm). Other characteristics are shown in Table-1.

Example 8

The C—Si composite material obtained in Example 1 and the C—Si composite material obtained in Example 6 were mixed together (the forward/the latter=50/50 (mass ratio)). The present example was performed in a manner similar to that performed in Example 1 except that the mixed C—Si composite material was used. A result thereof is shown in Table-1.

Example 9

The present example was performed in a manner similar to that performed in Example 1 except that a carbon black (primary particle size: 75 nm) was used. A C—Si composite material similar to that obtained in Example 1 could be obtained. The C—Si composite material obtained in the present example had a fiber shape (diameter: 3 μm, length: 25 μm). Other characteristics are shown in Table-1.

Example 10

The present example was performed in a manner similar to that performed in Example 1 except that a carbon black (primary particle size: 15 nm) was used. A C—Si composite material similar to that obtained in Example 1 could be obtained. The C—Si composite material obtained in the present example had a fiber shape (diameter: 1 μm, length: 15 μm). Other characteristics are shown in Table-1.

Example 11

The present example was performed in a manner similar to that performed in Example 1 except that a metallic Si (average grain size: 0.02 μm) was used. A C—Si composite material similar to that obtained in Example 1 could be obtained. The C—Si composite material obtained in the present example had a fiber shape (diameter: 2 μm, length: 35 μm). Other characteristics are shown in Table-1.

Example 12

The present example was performed in a manner similar to that performed in Example 1 except that a metallic Si (average grain size: 5 μm) was used. A C—Si composite material similar to that obtained in Example 1 could be obtained. The C—Si composite material obtained in the present example had a fiber shape (diameter: 6 μm, length: 25 μm). Other characteristics are shown in Table-1.

Comparison Example 1

A carbon black (primary particle size: 35 nm, iron: 1 ppm) of 7 pts.mass, metallic Si (average grain size: 0.4 μm) of 13 pts.mass, artificial graphite of 74 pts.mass, carboxymethyl cellulose of 2 pts.mass, and styrene-butadiene copolymer particle of 4 pts.mass were dispersed in water of 400 pts.mass. The dispersing liquid was applied on a surface of a copper foil. The copper foil was dried and pressed. A lithium ion battery negative electrode could be obtained. A lithium foil (counter electrode) was used. Ethylene carbonate/diethylenecarbonate (1/1 (volume ratio): electrolytic solution) was used. LiPF$_6$ (electrolyte) of 1 mol % was used. A coin cell for lithium ion battery was produced.

Evaluation similar to that performed in Example 1 was performed. A result thereof is shown in Table-1.

Incidentally, the material of Comparison Example 1 did not show the characteristics of the present invention.

Comparison Example 2

The present comparison example was performed in a manner similar to Example 7 except that a metallic Si (average grain size: 0.02 μm) was used. A result thereof is shown in Table-1.

Comparison Example 3

The present comparison example was performed in a manner similar to Example 7 except that a metallic Si (average grain size: 5 μm) was used. A result thereof is shown in Table-1.

electrode material. The C—Si composite materials of the above described examples could be obtained with ease.

REFERENCE CHARACTER LIST 1 spinning body (disk)
3 collection plate
4 nonwoven fabric
11 tank
12 spinning nozzle
13 heated air
14 yarn

The invention claimed is:

1. A carbon-silicon composite material, comprising:
   a carbon black; and
   a silicon particle;
   wherein:
   the carbon black has a primary diameter of 21 to 69 nm;
   the silicon particle has a grain size of 0.3-3 μm;
   the carbon black and the silicon particle are bound via a resin thermolysis product;
   the silicon particle is covered with the resin thermolysis product;
   a silicon content of the carbon-silicon composite material is 20-96 mass %;
   the resin is a thermoplastic resin; and
   the carbon-silicon composite material is a particle having a diameter of 5-15 μm.

2. The carbon-silicon composite material of claim 1, wherein a carbon content of the carbon-silicon composite material is 4 to 80 mass %.

TABLE 1

|  | C—Si composite material | | | initial | |
| --- | --- | --- | --- | --- | --- |
|  | C/Si (mass ratio) | specific surface area (m$^2$/g) | electrode density (g/cm$^3$) | discharge capacity (mAh/g) | coulombic efficiency (%) | cycle characteristic (%) |
| Example 1 | 35/65 | 12 | 1.60 | 657 | 86 | 91 |
| Example 2 | 36/64 | 8 | 1.55 | 632 | 88 | 90 |
| Example 3 | 78/22 | 21 | 1.63 | 411 | 85 | 96 |
| Example 4 | 8/92 | 20 | 1.70 | 851 | 84 | 84 |
| Example 5 | 33/67 | 18 | 1.63 | 645 | 83 | 86 |
| Example 6 | 35/65 | 35 | 1.75 | 621 | 82 | 88 |
| Example 7 | 15/85 | 12 | 1.55 | 870 | 83 | 75 |
| Example 8 | 35/65 | 17 | 1.63 | 635 | 84 | 90 |
| Example 9 | 35/65 | 12 | 1.60 | 606 | 84 | 77 |
| Example 10 | 35/65 | 23 | 1.50 | 623 | 85 | 76 |
| Example 11 | 36/64 | 23 | 1.60 | 588 | 78 | 83 |
| Example 12 | 36/64 | 7 | 1.60 | 531 | 75 | 85 |
| Comparison Example 1 |  |  | 1.60 | 635 | 54 | 41 |
| Comparison Example 2 | 14/86 | 55 | 1.20 | 330 | 30 | 45 |
| Comparison Example 3 | 20/90 | 3 | 1.60 | 350 | 53 | 61 |

The following is found out based on a comparison between the examples and the comparison example 1. The mixture of the metallic Si and the carbon black only added to the negative electrode does not enhance the cycle characteristic. The irreversible capacity is large. An initial coulombic efficiency is low.

The silicon content in the C—Si composite material obtained in the above examples is large. It was suitable (e.g., high conductivity; high capacity; small irreversible capacity; long cycle life) to be used as a lithium ion battery negative 3. The carbon-silicon composite material of claim 1, wherein the resin mainly comprises a polyvinyl alcohol.

4. The carbon-silicon composite material of claim 1, wherein the carbon-silicon composite material is suitable for use as a negative electrode material for a battery.

5. A negative electrode, comprising the carbon-silicon composite material of claim 1.

6. A secondary battery, comprising the negative electrode of claim 5.

7. A method for producing the carbon-silicon composite material of claim 1, the method comprising:

preparing a dispersion liquid comprising a resin, a carbon black having a primary diameter of 21 to 69 nm, silicon, and a solvent;

removing the solvent from the dispersion liquid to obtain a carbon-silicon composite material precursor; and modifying the carbon-silicon composite material precursor into the carbon-silicon composite material.

8. The method of claim 7, wherein the resin is a thermoplastic resin.

* * * * *

UNITED STATES PATENT AND TRADEMARK OFFICE
CERTIFICATE OF CORRECTION

PATENT NO. : 10,720,638 B2  
APPLICATION NO. : 15/574894  
DATED : July 21, 2020  
INVENTOR(S) : Takahiro Kitano

Page 1 of 1

It is certified that error appears in the above-identified patent and that said Letters Patent is hereby corrected as shown below:

On the Title Page

Item (73), the Assignee's name is misspelled. Item (73) should read:  
--(73) Assignee: Tec One Co., Ltd., Nomi-shi (JP)--

Signed and Sealed this  
Fifteenth Day of September, 2020

Andrei Iancu  
*Director of the United States Patent and Trademark Office*